Figure 1:
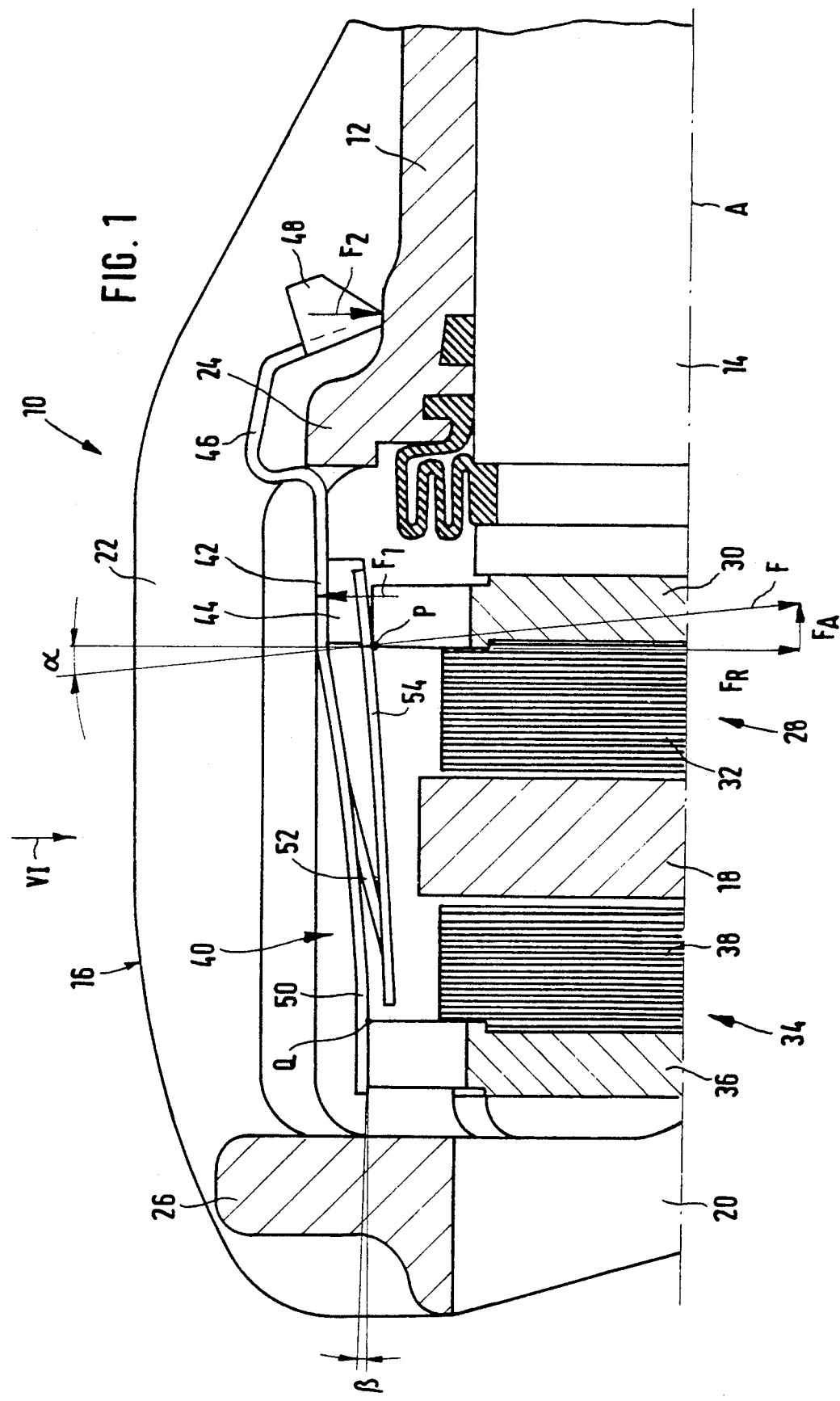

United States Patent [19]

Madzgalla et al.

[11] Patent Number: 5,069,314
[45] Date of Patent: Dec. 3, 1991

[54] SPOT TYPE DISC BRAKE INCLUDING AN IMPROVED HOLD DOWN SPRING

[75] Inventors: Hans-Georg Madzgalla; Frank Madzgalla, both of Koblenz, Fed. Rep. of Germany

[73] Assignee: Lucas Industries public limited company, Birmingham, England

[21] Appl. No.: 530,299

[22] Filed: May 30, 1990

[30] Foreign Application Priority Data

Jun. 7, 1989 [DE] Fed. Rep. of Germany ....... 8906980

[51] Int. Cl.⁵ .............................................. F16D 65/02
[52] U.S. Cl. ............................... 188/73.36; 188/73.38; 188/205 A
[58] Field of Search ............... 188/73.35, 73.36, 73.38, 188/205 A, 73.37

[56] References Cited

U.S. PATENT DOCUMENTS

| 4,538,708 | 9/1985 | Seki | 188/73.38 |
| 4,624,344 | 11/1986 | Gerard et al. | 188/73.38 X |
| 4,699,254 | 10/1987 | Mery | 188/73.38 X |
| 4,940,120 | 7/1990 | Schmidt et al. | 188/73.36 |

FOREIGN PATENT DOCUMENTS

| 2114812 | 10/1971 | Fed. Rep. of Germany | 188/73.38 |
| 3244790 | 6/1984 | Fed. Rep. of Germany | 188/73.38 |
| 0109838 | 8/1980 | Japan | 188/73.38 |
| 0018129 | 2/1981 | Japan | 188/73.36 |

Primary Examiner—Douglas C. Butler
Attorney, Agent, or Firm—Oblon, Spivak, McClelland, Maier & Neustadt

[57] ABSTRACT

On the caliper (10) of a spot-type disc brake a hold-down spring (40) of sheet metal is supported with a supporting region (42) formed thereon near a brake pad (28); from there it extends in cantilever manner beyond the brake disc (18). The hold-down spring (40) comprises two pairs of spring legs (50, 52) which are separated from each other by a first pair of axial slots (60) and in the relaxed state lie at least approximately in a common plane and extend beyond the brake disc (18). A first pair of the spring legs (50) presses against the brake pad (34) remote from the support region (42). A second pair of the spring legs (52) is separated by a second pair of axial slots (64) from a third spring leg (54) in such a manner that the second pair (52) and the third spring leg (54) are joined only at their ends remote from the support region (42) without being bent over. The third spring leg (54) presses with its other end onto the brake pad (28) adjacent the support region (42).

10 Claims, 5 Drawing Sheets

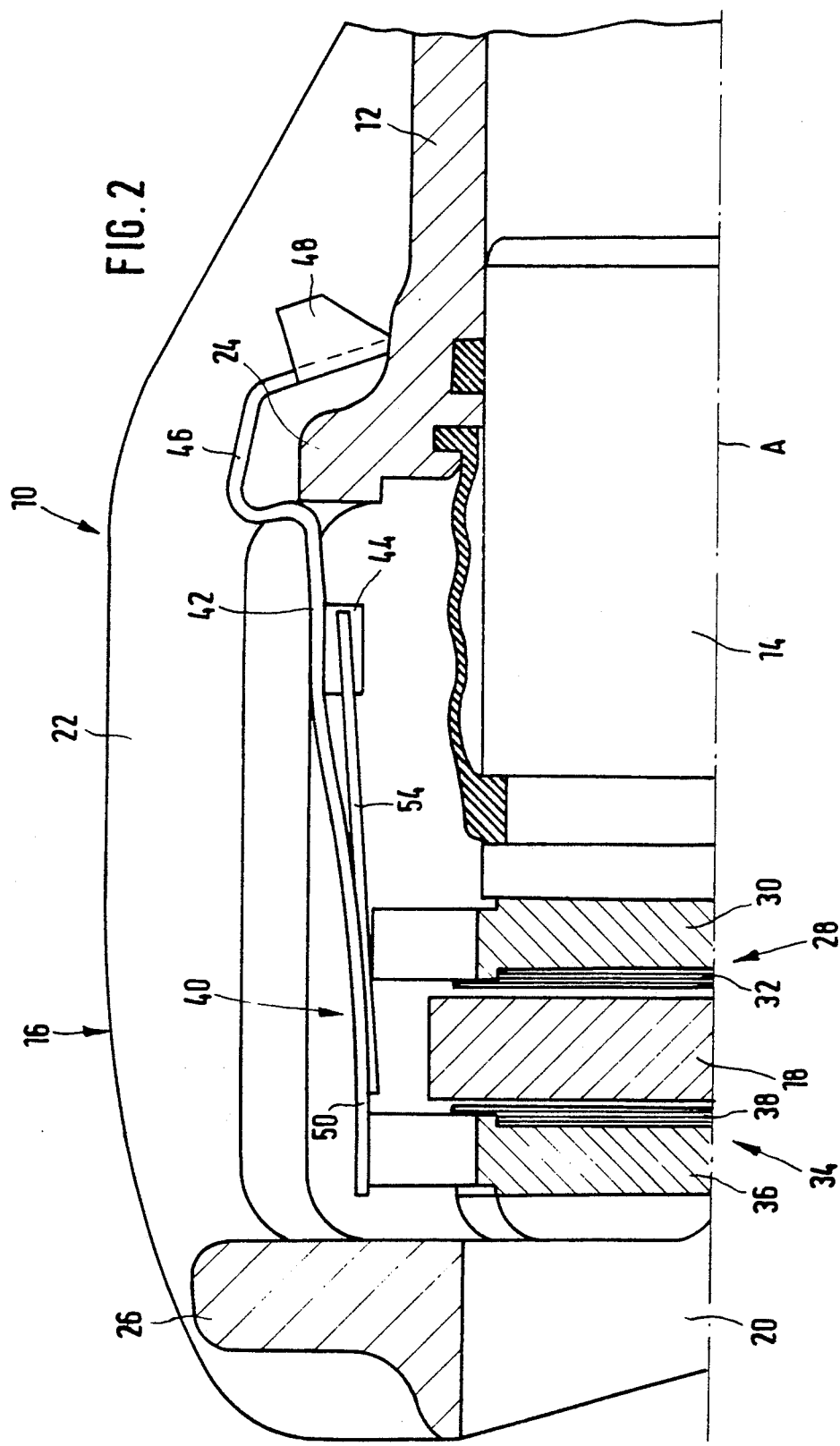

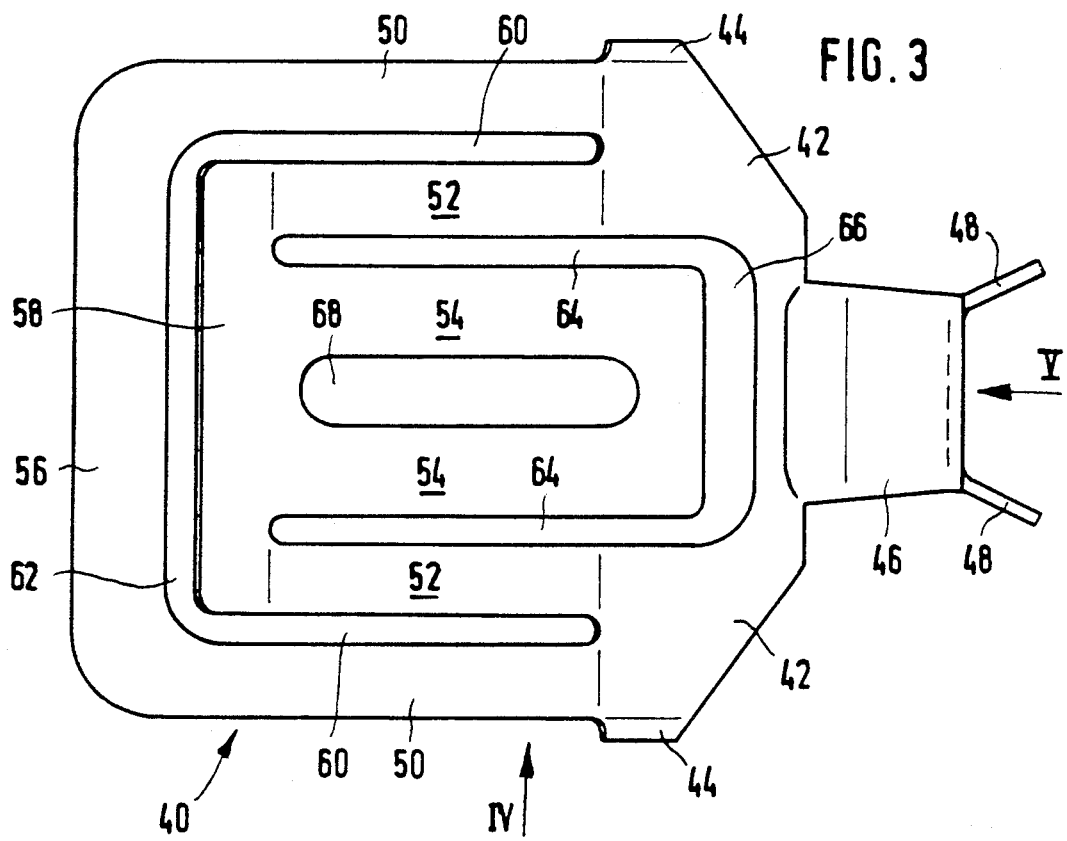
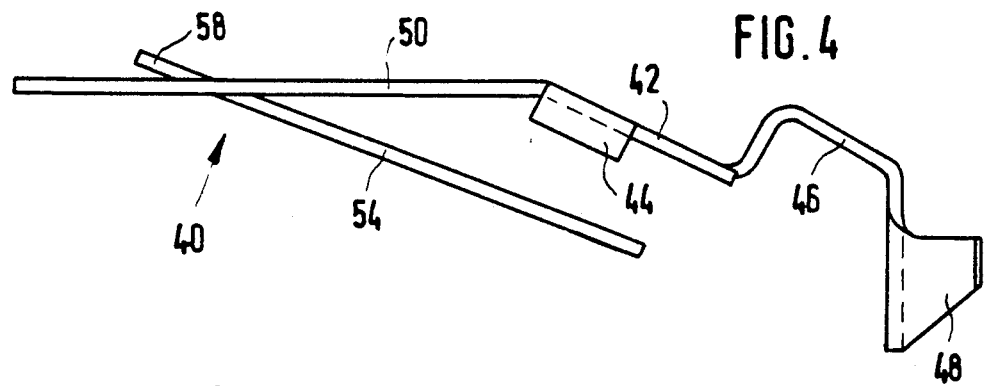
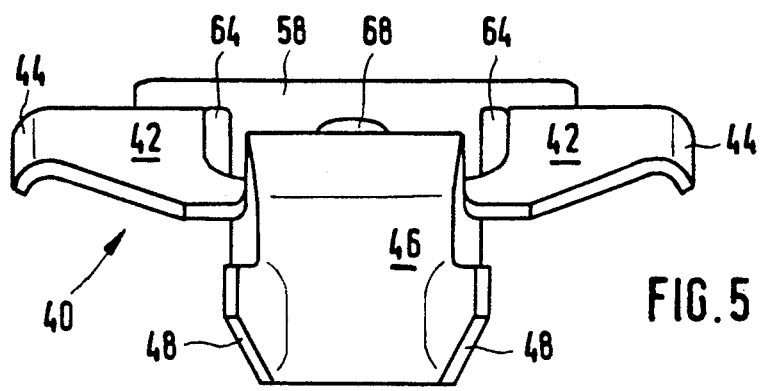

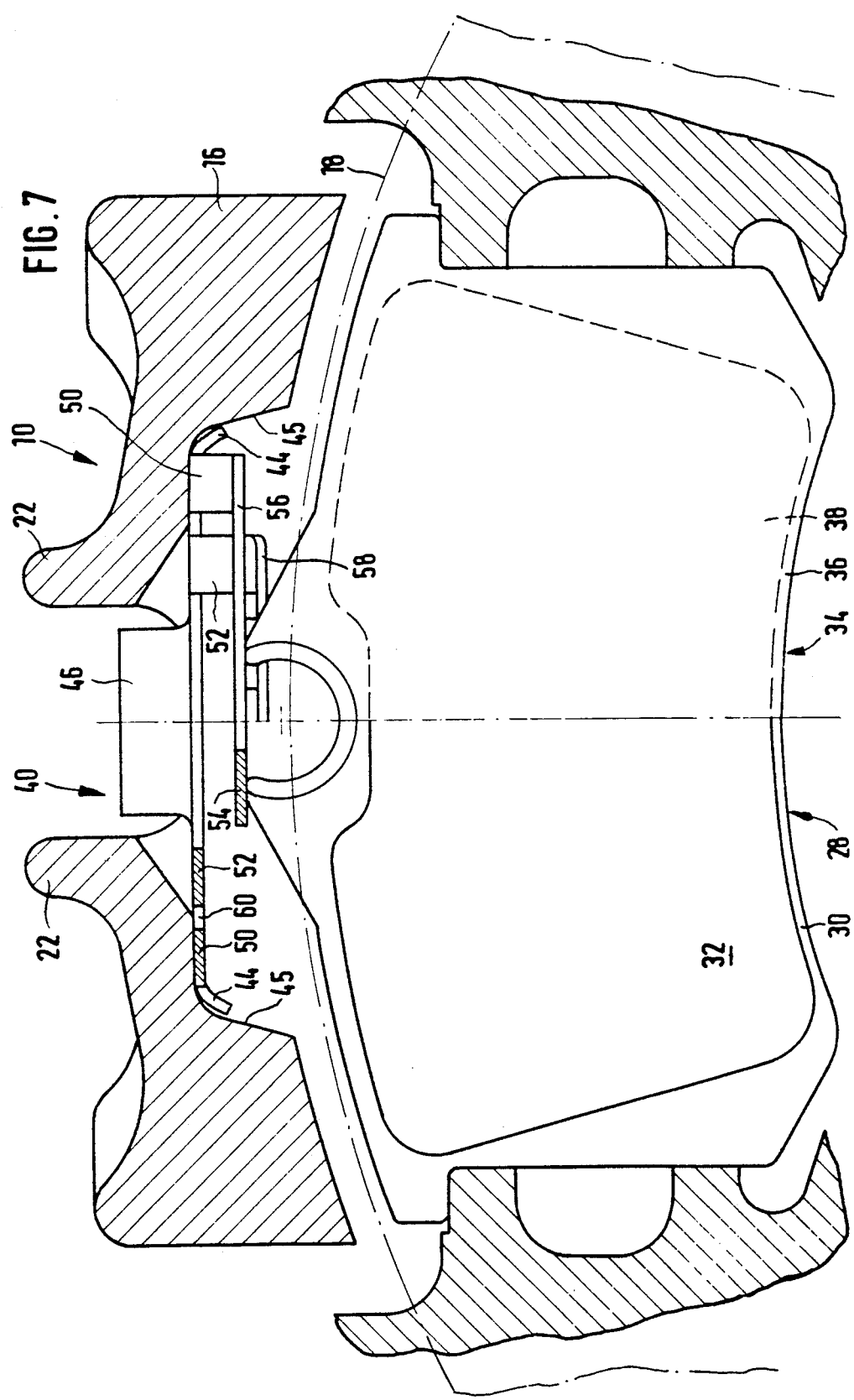

SPOT TYPE DISC BRAKE INCLUDING AN IMPROVED HOLD DOWN SPRING

The invention relates to a spot-type disc brake comprising
- a pair of brake pads which are adapted to be pressed against either side of a brake disc,
- a caliper which engages over the two brake pads and the brake disc and
- a hold-down spring of sheet metal which is supported with a support region formed thereon near one of the brake pads on the caliper, extends from there in cantilever manner beyond the brake disc and comprises spring legs pressing in each case on one of the brake pads.

A spot-type disc brake of this type is known from DE 2842790 C2. In the latter the caliper is a so-called sliding caliper which is displaceable parallel to the axis of the brake disc. The axially inner portion of the caliper with respect to the associated vehicle is formed as cylinder and contains an actuating piston with which one of the brake pads is directly actuable. On the opposite end of the caliper arms are formed on which the other brake pad is supported. Radially outside said arms an axis-parallel pin is secured to the caliper and to said pin a radial securing leg of a hold-down spring with a keyhole-like cutout is attached. In one embodiment the hold-down spring has three spring legs which extend axis-parallel adjacent each other away from the securing leg. The middle spring leg projects beyond the brake disc, is bent over in hairpin manner and presses against the directly actuable brake pad. The other two spring legs are shorter, likewise bent over in hairpin manner and both press against the other brake pad. In this constructional form having three adjacently arranged spring legs a relatively wide cutout is necessary in the caliper to accommodate the spring legs. The caliper, which is thereby locally weakened, must be correspondingly strengthened in adjacent regions and requires a correspondingly large amount of overall space between the outer edge of the brake disc and the rim of the associated wheel.

In another constructional form the hold-down spring consists of two nested stampings, the outer one of which has a spring leg pressing against the directly actuable brake pad whilst a spring leg pressing against the other brake pad is formed on the inner stamping. This hold-down spring can be accommodated in a relatively narrow cutout of the caliper but for its production from two stampings requires a correspondingly higher expenditure.

The invention is based on the problem of providing a spot-type disc brake having a hold-down spring which requires little overall space and can be made with little expenditure.

Proceeding from a spot-type disc brake of the type described at the beginning, the problem is solved according to the invention in that
- the hold-down spring comprises at least two spring legs which are separated from each other by a first axial slot and in the relaxed state lie at least approximately in a common plane and extend beyond the braked disc,
- at least a first of said spring legs presses against the brake pad remote from the support region,
- at least a second of said spring legs is separated by a second axial slot from a third spring leg in such a manner that the second and the third spring legs are joined only at their ends remote from the support region without being bent and
- the third spring leg presses with its other end against the brake pad adjacent the support region.

Due to the fact that all the legs of the hold-down spring extending in cantilever manner from the support region extend beyond the brake disc, each of the spring legs has a relatively flatly rising characteristic. This is of significance in particular for the cooperation with brake pads which during their life change their position with respect to the caliper due to lining wear. This applies to both brake pads when a brake with fixed caliper is involved; in the case of a brake with sliding caliper, however, only the directly actuated brake pad changes its position with respect to the caliper due to lining wear.

In a brake with sliding caliper the hold-down spring is therefore preferably arranged so that the third spring leg, of which the elasticity is added to that of the second spring leg, presses against the directly actuable brake pad. In each case, any hairpin bending of the spring legs of the hold-down spring according to the invention can be avoided so that the space requirement of the spring legs in the radial direction of the brake is extremely small.

Advantageous further developments of the invention will be apparent from the subsidiary claims.

Figure 6:
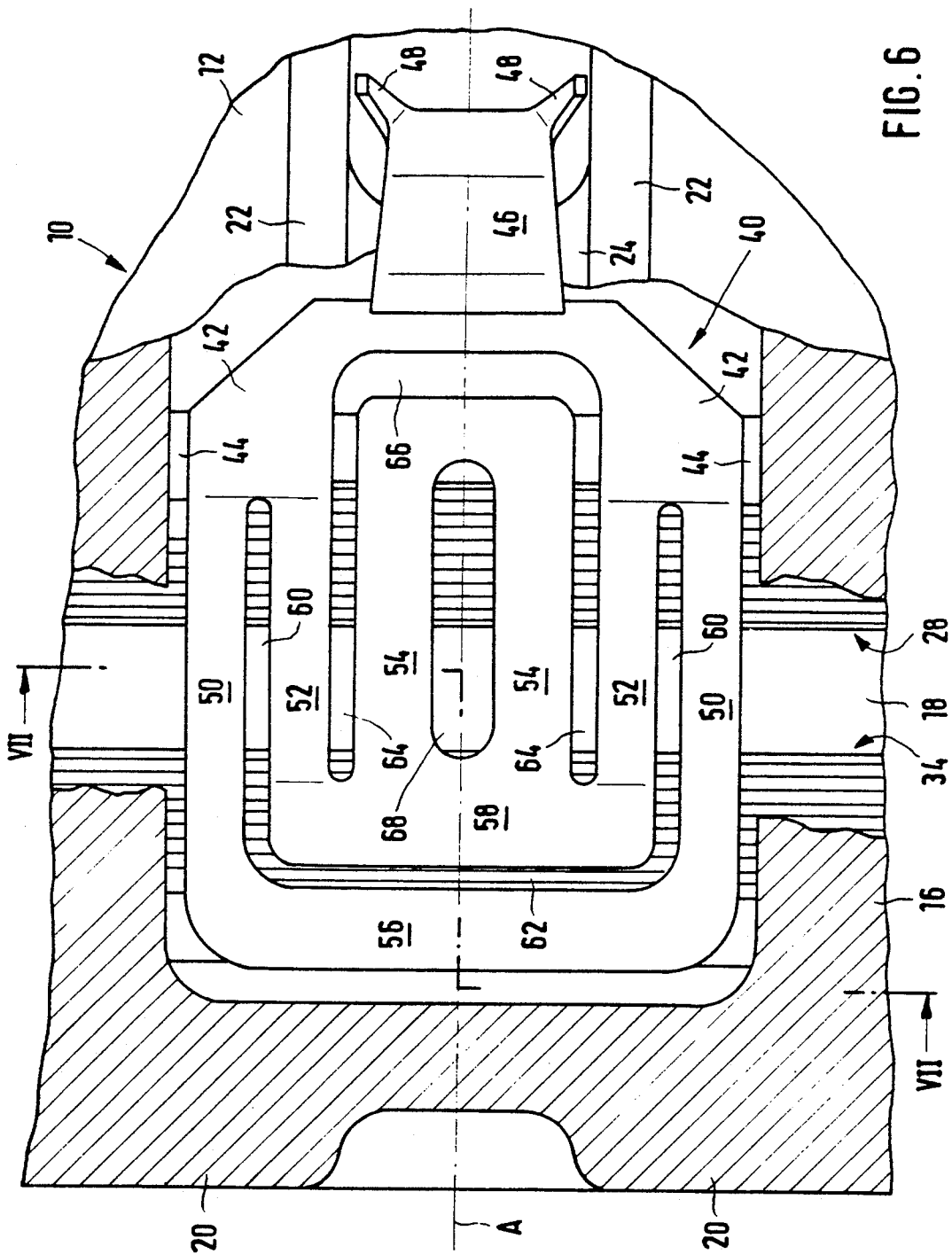

An example of embodiment with further details of the invention will be explained hereinafter with the aid of schematic drawings, wherein:

FIG. 1 shows an axial section through a radially outer region of a spot-type disc brake having a hold-down spring according to the invention and brake pads with new brake linings, FIG. 2 shows a corresponding axial section with worn brake linings, FIG. 3 shows the hold-down spring in plan view, FIG. 4 is the view IV of FIG. 3, FIG. 5 is the view V of FIG. 3, FIG. 6 is the view VI of FIG. 1 and FIG. 7 shows the section VII—VII of FIG. 6.

The spot-type disc brake illustrated has a caliper 10 which is formed as sliding caliper, i.e. is guided axially displaceably in usual manner on a brake support which is not illustrated. The caliper 10 is made integrally with a hydraulic cylinder 12 which contains a piston 14. From the cylinder 12 a bridge portion 16 of the caliper 10 extends beyond a brake disc 18; formed on the side of the caliper 10 remote from the cylinder 12 are two arms 20 which are axially opposite the piston 14. The axial direction in which the caliper 10 is displaceable coincides with the axis A of the cylinder 12.

The bridge portion 16 of the caliper 10 has two axis-parallel longitudinal ribs 22, only one of which is visible in FIGS. 1 and 2. The two longitudinal ribs 22 leave between them radially outside the brake disc 18 an axis-parallel cutout, are connected together by a cylinder 12 on the side of the caliper 10 inside with respect to the associated vehicle and by a transverse projection 24 and terminate on the vehicle outer side of the caliper 10 in a yoke 26 from which the two arms 20 extend radially inwardly.

Between the brake disc 18 and the piston 14 a brake pad 28 is arranged which is actuated directly by said piston and which comprises a support plate 30 bearing on the piston 14 and a brake lining 32. Between the brake disc 18 and the arms 20 a brake pad 34 is arranged which is actuable by axial displacement of the caliper 10 and comprises a support plate 36 bearing on the arms 20 as well as a brake lining 38.

For holding down the two brake pads 28 and 34 a hold-down spring 40 is clamped between the caliper 10 and the support plates 30 and 36 and is shown separately in FIGS. 3 to 5 in the relaxed state. The hold-down spring 40 comprises a planar support region 42 which is adjoined on its two axis-parallel edges in each case by downwardly bent wings 44. With the support region 42 including the two wings 44 the hold-down spring 40 engages beneath the two longitudinal ribs 22 in such a manner that it transmits radially outwardly directed forces in the support region 42 to the caliper 10. The two wings 44 are each guided on a shoulder 45 of the caliper 10 parallel to the axis A of the brake disc 18.

Adjoining the support region 42 on the hold-down spring 40 a hook-like extension 46 is formed which engages beyond the transverse projection 24 of the caliper 10 and presses with its end against the outer wall of the cylinder 12. At the end region of the extension 46 a pair of tabs 48 are formed and engage between the longitudinal ribs 22.

By these supportings the hold-down spring 40 is prevented from turning clockwise in the plane of the drawings of FIGS. 1 and 2; also, any rotation of the hold-down spring 40 about an axis extending in the plane of the drawings of FIGS. 1 and 2 normal to the axis A is prevented.

Starting from the support region 42, a pair of outer spring legs 50 and a pair of middle spring legs 52 extend beyond the brake disc 18. In the relaxed state of the hold-down spring 40 the outer and middle spring legs 50, 52 lie in a common plane which includes an obtuse angle with the plane of the support region 42. The ends of the centre spring legs 52 remote from the support region 42 are adjoined without hairpin-like bending by an inner spring leg 54 which extends back at an acute angle in the direction towards the support region 42.

The ends of the two outer spring legs 50 remote from the support region 42 are connected together by an outer web lying in the plane thereof. In corresponding manner, the ends of the middle spring legs 52 remote from the support region 42 are joined together by a centre web 58; the latter lies in the example illustrated in the same plane as the inner spring leg 54, i.e. forms with the plane of the middle spring legs 52 an acute angle, as apparent in particular from FIG. 4.

Each of the two outer spring legs 50 is separated from the adjacent middle spring leg 52 by an axial slot 60. The two transverse webs 56 and 58 are separated from each other by a transverse slot 62 which together with the axial slots 60 forms a U-shaped slot arrangement. In corresponding manner, the inner spring leg 54 is separated from the two middle spring legs 52 in each case by an axial slot 64 and is further separated from the support region 42 by a transverse slot 66. The slots 64 and 66 form a further U-shaped slot arrangement which is inverted with respect to the slot arrangement 60, 62 and engages into the latter. Finally, in the middle spring leg 54 an axial slot 68 is formed which in the example illustrated does not extend up to the two transverse slots 62 and 66. The axial slot 68 is appreciably wider than the other slots and serves in particular for observing the wear state of the brake linings 32 and 38.

In the new state of the brake linings 32 and 38 the spring legs 50, 52 and 54 of the hold-down spring 40 assume the position shown in FIG. 1. The ends of the outer spring legs 50 remote from the support region 42 press against the radially outer edge of the support plate 36 of the brake pad 34; the free ends of the inner spring leg 54 press against the radially outer edge of the support plate 30 of the brake pad 28. The inner spring leg 54 exerts on the brake pad 28 a hold-down force F which according to FIG. 1 has a radial component $F_R$ and an axis-parallel component $F_A$ directed towards the piston 14. The axis-parallel component $F_A$ results from the fact that the surface normal of the inner leg 54 in its point P of contact with the outer edge of the support plate 30 is inclined to the plane of said support plate 30 (and of the brake disc 18) at an angle $\alpha$. The force component $F_A$ tends permanently to push the brake pad 28 away from the brake disc 18.

In corresponding manner the surface normal of the outer spring leg 50 in its point Q of contact with the plane of the support plate 36 makes an angle $\beta$ so that the hold-down force exerted by the outer spring legs 50 has an axial component which tends to hold the support plate 36 in permanent engagement with the arms 20.

Forces $F_1$ and $F_2$ with which the hold-down spring 40 acts on the caliper 10 correspond to the forces exerted by the hold-down spring 40 on the brake pads 28 and 34. The force $F_1$ is directed radially outwardly and is exerted by the support region 42 on the radially inner wall region of the longitudinal ribs 22; the force $F_2$ is directed radially inwardly and is exerted by the free end of the hook-like extension 46 of the hold-down spring 40 on the outer wall of the cylinder 12.

We claim:

1. Spot-type disc brake comprising
   first and second brake pads which are adapted to be pressed against respective opposite sides of a brake disc,
   a caliper which engages over said pads and said brake discs, and
   a hold-down spring of sheet metal supported by a support region formed thereon near said first brake pads on the caliper and extending from said support region in cantilever manner beyond said brake disc, wherein the hold-down spring comprises first, second and third spring legs extending parallel to the axis of said disc, said first and second spring legs being separated from each other by a first axial slot and in the relaxed state lie at least approximately in a common plane and extend beyond said brake disc,
   said first spring leg having a portion remote from the support region which portion pressing against said second brake pad,
   said second spring leg being separated by a second axial slot from said third spring leg in such a manner that the second and the third spring legs are joined only at their ends remote from said support region without being bent with respect to each other,
   said third spring leg pressing with its end near said support region against said first brake pad, said first and second axial slots extending parallel to the axis said disc.

2. Spot-type disc brake according to claim 1, characterized in that the first, second and third spring legs of said hold-down spring adjoin each other in Z-like manner in an axial section through the brake when said spring is installed in said brake in a plane normal to the plane of said disc.

3. Spot-type disc brake according to claim 1 or 2, characterized in that a pair of first spring legs is separated by a U-shaped first slot arrangement from a pair of second spring legs and that the third spring leg is separated by an inverted U-shaped second slot arrangement from the pair of second spring legs and from the support region.

4. Spot-type disc brake according to to claim 1 or 2 characterized in that said third spring leg includes an axial slot for observing the wear state of brake linings of said brake pads.

5. Spot-type disc brake according to claim 1 or 2 wherein said support region of said hold-down spring when installed lies in a plane parallel to axis (A) of said brake disc and is configured for transmitting radially outwardly directed forces ($F_1$) from said hold-down spring to said caliper said spring including a hook-like extension engaging over an outer projection of said caliper and being configured for transmitting radially inwardly directed forces ($F_2$) to said caliper.

6. Spot-type disc brake according to claim 1 or 2 wherein said support region of the hold-down spring includes a pair of lateral wings which are each guided on shoulders of said caliper parallel to said axis (A) of said brake disc.

7. Spot-type disc brake according to claim 6, wherein said hook-like extension includes a pair of lateral tabs which each bear on a longitudinal rib of said caliper.

8. Spot-type disc brake according to claim 1 or 2 wherein said first and third legs of said hold-down spring, when installed and at least in the regions in which each presses on one of said brake pads are inclined in such a manner that the hold-down forces (F) exerted by them have a component ($F_A$) directed away from said brake disc.

9. Spot-type disc brake according to claim 1 or 2, wherein said caliper is a sliding caliper which transmits reaction forces of said first brake pad to said second brake pad actuable by shifting of said caliper wherein said hold-down spring is supported with its support region near said first brake pad on said caliper and presses with its third spring leg onto said first brake pad.

10. Spot-type disc brake according to claims 1 or 2 wherein said first and second spring legs are paired with matching legs and wherein said first and second axial slots are paired with matching slots to define first and second U-shaped slots, said first U-shaped slot separating said first pair of spring legs from said second pair of spring legs, said second U-shaped slot being inverted from said first U-shaped slot and separating said second pair of spring legs from said third spring leg while also separating the latter from said support region.

* * * * *